United States Patent [19]
Reudi

[11] Patent Number: 5,351,723
[45] Date of Patent: Oct. 4, 1994

[54] THREE DIMENSIONAL CAM DRIVE FOR GRIPPER LOOM BELT WHEEL

[75] Inventor: Maurer Reudi, Bubikon, Switzerland

[73] Assignee: Sulzer Rueti AG, Rueti, Switzerland

[21] Appl. No.: 131,063

[22] Filed: Oct. 4, 1993

[30] Foreign Application Priority Data

Oct. 6, 1992 [DE] Fed. Rep. of Germany ....... 4233636

[51] Int. Cl.⁵ .......................................... D03D 47/12
[52] U.S. Cl. ........................................ 139/449; 74/54; 74/569
[58] Field of Search .................... 139/449; 74/54, 569

[56] References Cited

U.S. PATENT DOCUMENTS

| | | | |
|---|---|---|---|
| 4,597,302 | 7/1986 | McLendon, Jr. | 74/569 X |
| 4,844,132 | 7/1989 | Cinel et al. | 139/449 |

FOREIGN PATENT DOCUMENTS

| | | | |
|---|---|---|---|
| 0077087 | 4/1983 | European Pat. Off. | 139/449 |
| 3029642 | 2/1981 | Fed. Rep. of Germany | 139/449 |
| 0015540 | 1/1984 | Japan | 139/449 |
| 2196713 | 5/1988 | United Kingdom | 139/449 |

*Primary Examiner*—Andrew M. Falik
*Attorney, Agent, or Firm*—Townsend and Townsend Khourie and Crew

[57] ABSTRACT

An apparatus for driving a gripper belt in a rapier loom comprises a three-dimensional cam drive (1) for converting a rotational movement into a pivotal movement. The cam drive includes a rotatable cam carrier with a guide surface defining a closed curve (11), the closed curve having a generatrix (E) which is a circular arc. A pivot arm (5) engages the curved surface and pivots about an axis (3) of rotation through the center point of the generatrix. The apparatus is compact and it facilitates the adjustment of the stroke length of the gripper belt.

11 Claims, 3 Drawing Sheets

THREE DIMENSIONAL CAM DRIVE FOR GRIPPER LOOM BELT WHEEL

BACKGROUND OF THE INVENTION

The present invention concerns a device for driving a gripper belt which has a three-dimensional cam drive for converting a rotational movement into a swinging movement with a cam carrier that executes a rotational movement and with a pivot arm that engages the cam carrier and executes the swinging movement. The invention also concerns a loom having such a device.

It is known to convert the rotational movement of the drive shaft of a rapier loom into a reciprocating movement for a gripper belt wheel with the help of a crank arm having a cardan joint or with the help of a three-dimensional cam drive.

Three-dimensional cam drives provided for this purpose employ a rotating cam carrier which is engaged by a pivot arm which generates the desired swinging movement.

Grooved cam globoids or hyperboloids are suitable curve carriers, but in practice, for manufacturing reasons, they are formed as cylindrical curves.

Such cam drives have the disadvantage that the pivot angle is limited. To compensate for this disadvantage, the diameter of the cam cylinder is made correspondingly large and the length of the pivot arm is increased. This leads to other disadvantages; namely, large masses and a limited stroke.

SUMMARY OF THE INVENTION

It is an object of the invention to provide a gripper belt drive which has a cam curve carrier that is smaller in size and correspondingly lighter.

Advantages provided by the present invention include a simple design, small space requirements, and optimal stroke settings.

A rapier loom having a belt wheel and a device made as described above is characterized in that the shaft is operatively connected with the belt wheel to establish the drive.

Advantageous embodiments of the invention are described below.

BRIEF DESCRIPTION OF THE DRAWINGS

This invention is described by reference to the accompanying drawings, which show.

DETAILED DESCRIPTION OF THE PREFERRED EMBODIMENTS

Figure 1:
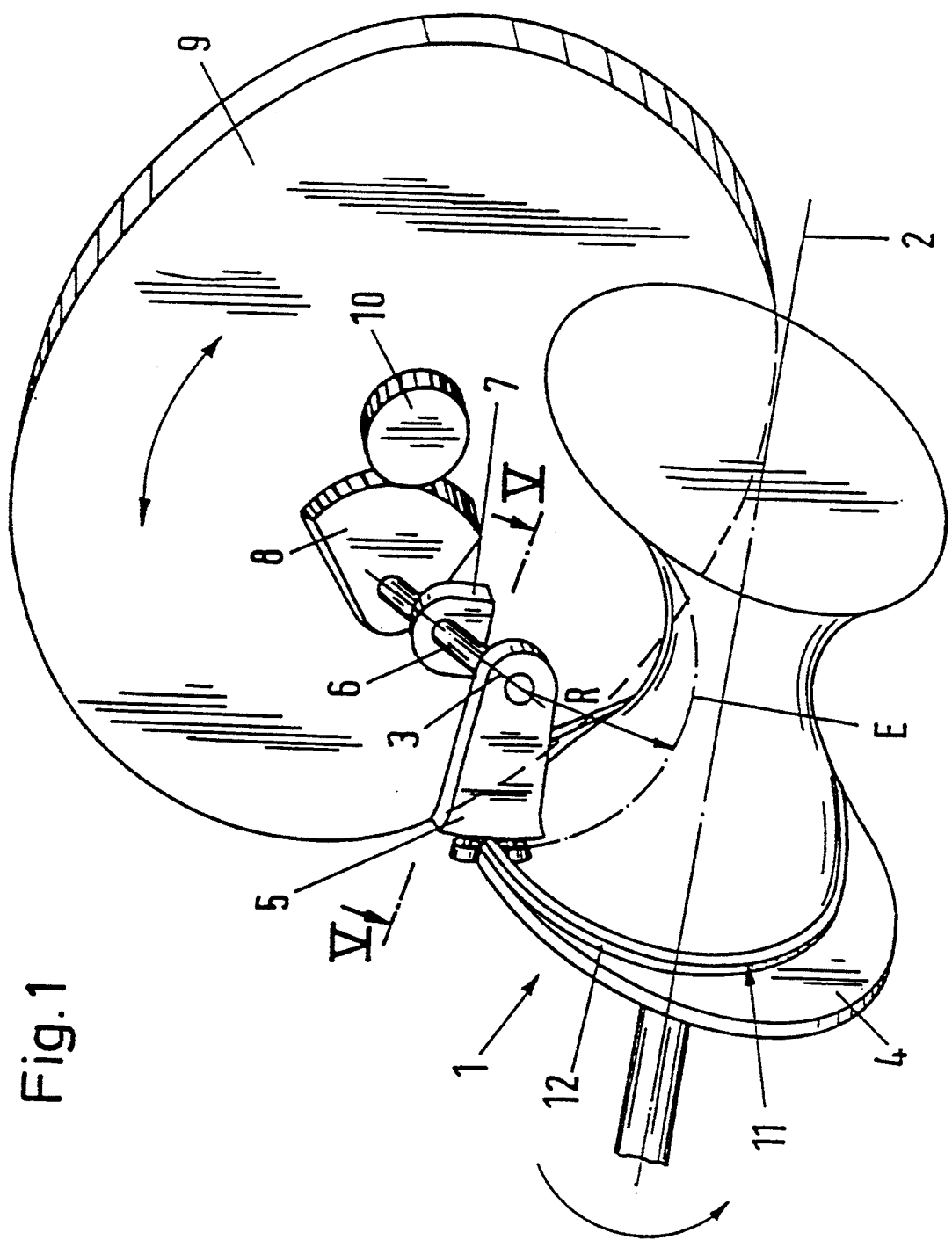
FIG. 1 is a three-dimensional representation of a first embodiment of a device provided with a belt wheel in accordance with the invention.

FIG. 1 shows an arrangement for reciprocating a gripper belt. It includes a three-dimensional cam curve drive 1 with intersecting and perpendicular first and second axes of rotation 2 and 3. The cam drive 1 has a cam carrier 4 which rotates about the first axis of rotation 2 and a pivot arm 5 in engagement with the cam carrier 4 which pivots back and forth about the second axis of rotation 3. The arrangement further includes a shaft 6 which rotates about the second axis of rotation 3 and is rigidly connected to pivot arm 5, a stationary bearing 7 for shaft 6, a gear segment 8 non-rotatably mounted on shaft 6, and a gripper belt wheel 9 with a gear sprocket 10 in engagement with gear segment 8. Cam carrier 4 is a rotating body the generatrix E of which is an arc (which is concentric with shaft 6) with a radius R so that a body with a globoid surface is formed. A projection 11 with two flat flanks 12 forming a closed curve is provided on the surface of cam carrier 4. The curve of the projection is such that a revolution of the cam carrier 4 about the first axis of rotation 2 results in a pivotal movement of approximately 180° about the second axis of rotation 3.

Figure 2:
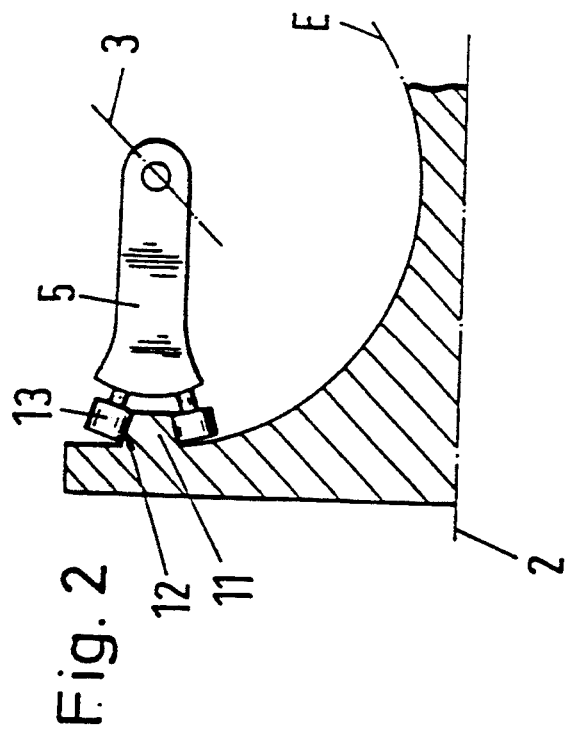
FIG. 2 is a section taken along line II—II and illustrates the interaction of the cam curve with a pivot arm.

As is particularly shown in FIG. 2, pivot arm 5 is a one-armed lever equipped with two rollers 13 at its free end which roll along flanks 12. For this purpose, rollers 13 are spaced apart and their surfaces are preferably axially concave to improve their running properties. It is also advantageous to mount rollers 13 on roller bearings (not shown) to further improve the running properties.

Figure 3A:
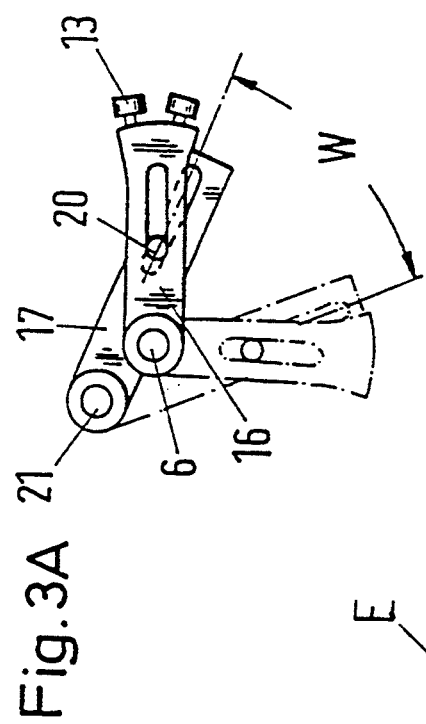
FIGS. 3A and 3B show an arrangement for adjusting the pivot angle W.
Figure 3B:
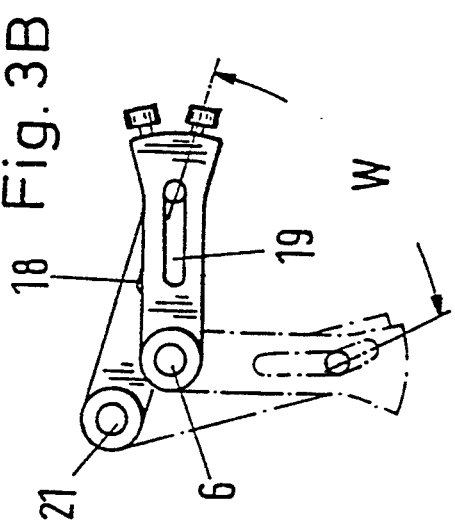

In the embodiment illustrated in FIG. 1, the belt wheel 9 is pivoted through a predetermined pivot angle by rotating cam carrier 4. The arrangement illustrated in FIGS. 3A and 3B is provided to adjust this fixed ratio.

This arrangement includes a pivot arm 16, provided with an elongated slot 17, and a control lever 18 having an elongated slot 19, interconnected by a guide pin 20. Guide pin 20 is positioned on control lever 18 in such a way that its location inside elongated slot 19 is adjustable and it projects into the slot 17 in pivot arm 16. Pivot arm 16 is non-rotatably mounted on shaft 6 and control lever 18 is carried on a shaft 21. As is shown in FIGS. 3A and 3B, the pivot angle of pivot arm 16 can be varied by changing the position of guide pin 20 in slot 19 because the pivot axes of the pivot arm and the control lever are fixed with respect to each other.

Figure 4:
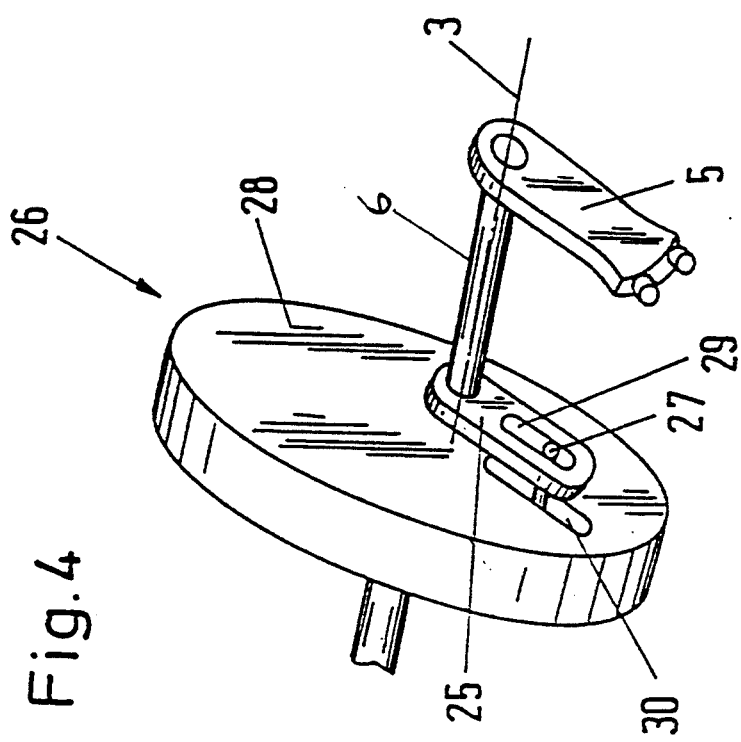
FIG. 4 shows an arrangement for transferring the pivotal motion to a belt wheel.

FIG. 4 shows an arrangement for transmitting adjustable pivotal movements to the belt wheel. This arrangement includes a control lever 25 and a planetary gear drive 26. The control lever 25 is non-rotatably mounted on shaft 6, which is in turn connected with pivot arm 5 and rotatable about the second axis of rotation 3. The control lever 25 is connected to annular wheel 28 of planetary gear drive 26 by way of a guide pin 27. Guide pin 27 extends into and is adjustable along an elongated slot 29 in control lever 25. An elongated, slot-like recess 30 is formed in the side wall of the annular wheel 28 and is engaged by the guide pin. As is shown in FIGS. 3A and 3B, the pivot angle W can be adjusted by changing the position of guide pin 27 in slot 29.

If pivot angle adjustments are not needed, pivot arm 5 can be directly connected to annular wheel 28.

Figure 5:
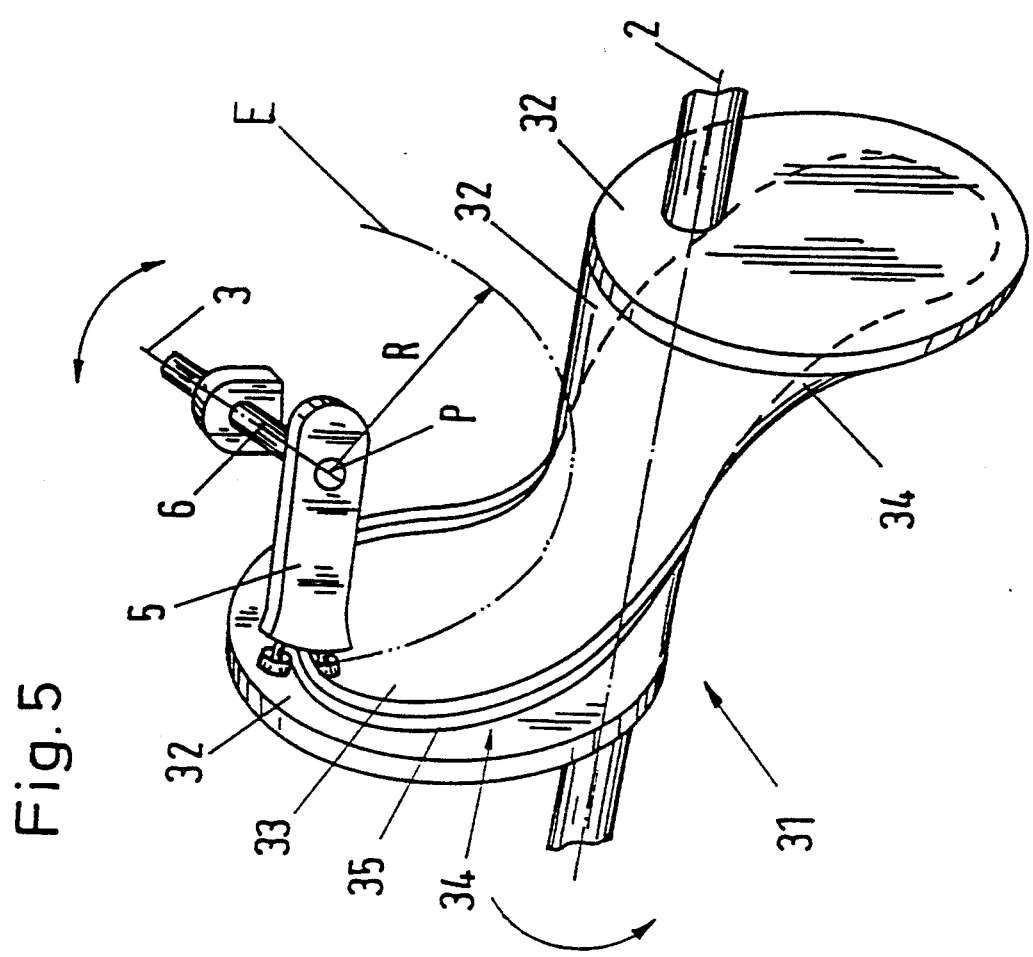
FIG. 5 is a three-dimensional representation of a cam curve drive made according to a second embodiment of the invention.

FIG. 5 shows spatially and schematically the elements of a three-dimensional cam drive for converting a rotational movement into a pivotal movement; namely, a rotating cam curve carrier 31 and a pivot arm 5 that executes pivotal movements. Cam carrier 31 is essentially a rotating body the generatrix of which is a circular arc. For reasons of economy, unneeded material has been eliminated. The axis of rotation of the generatrix is the axis of rotation of the cam carrier 31. Cam carrier 31 comprises two body sections 32 of identical contours which are offset 180° with respect to each other. Cam carrier 31 is symmetrical and rotates about axis 2. The surfaces of the body sections 32 have surface segment 33 which border each other and together form a surface that is a globoid. A projection 34 is formed on this surface and defines a closed curve. Rotation of the cam curve carrier about axis of rotation 3 results in a pivotal movement of approximately 180° about the pivot axis.

Pivot arm 5 is identical to the one shown in FIG. 1 and is therefore not further described here. The pivotal motion of the pivot arm is transferred to the gripper belt wheel (not shown) with the same elements as utilized by the device shown in FIG. 1.

What is claimed is:

1. An apparatus for driving a gripper belt, the apparatus including a three-dimensional cam drive for converting a rotational movement into a pivotal movement, the drive comprising:
   a rotatable cam carrier having at least one surface section forming a guide surface, the guide surface being a closed curve and having a generatrix defining a circular arc with a center point; and
   a pivot arm engaging the guide surface of the cam carrier and non-rotatably connected to a shaft, the shaft having an axis of rotation that is concentric with the center point of the generatrix, rotation of the cam carrier causing the pivot arm to pivot about the axis of rotation of the shaft.

2. Apparatus according to claim 1 wherein the guide surface comprises two parallel cam surfaces.

3. Apparatus according to claim 2 wherein the cam surfaces are surfaces of a groove.

4. Apparatus to claim 2 wherein the cam surfaces are surfaces of a projection.

5. Apparatus according to claim 1 wherein the pivot arm is a one-armed lever and includes at least one rotating member in contact with the guide surface.

6. Apparatus according to claim 5 wherein the rotating member has a cylindrical surface in contact with the guide surface.

7. Apparatus according to claim 5 wherein the rotating member has an axially convex surface.

8. Apparatus according to claim 1 wherein the pivot arm includes two spaced-apart rotating members.

9. Apparatus according to claim 1 further comprising a planetary gear drive including an annular wheel non-rotatably mounted on the shaft and a control lever connected to the annular wheel by a guide pin within elongated slots in the annular wheel and the control lever, the guide pin adjusting a pivot angle of the annular wheel with respect to the axis of rotation.

10. Apparatus according to claim 1 further comprising a belt wheel connected to the shaft and a lever arrangement for adjusting a predetermined pivot angle of the belt wheel.

11. A rapier loom comprising:
   a gripper belt;
   a three-dimensional cam drive for converting a rotational movement into a pivotal movement and for driving the gripper belt, the drive including:
      a rotatable cam carrier having at least one surface section forming a guide surface, the guide surface being a closed curve and having a generatrix defining a circular arc with a center point; and
      a pivot arm engaging the guide surface of the cam carrie and non-rotatably connected to a shaft, the shaft having an axis of rotation that is concentric with the center point of the generatrix, rotation of the cam carrier causing the pivot arm to pivot about the axis of rotation of the shaft; and
   a belt wheel connected to the shaft so that pivotal movements of the cam carrier pivots the belt wheel about the axis of rotation of the shaft.

* * * * *